Aug. 6, 1929.  F. R. WEYMOUTH  1,723,963
AIRPLANE SHOCK ABSORBER
Filed April 4, 1927
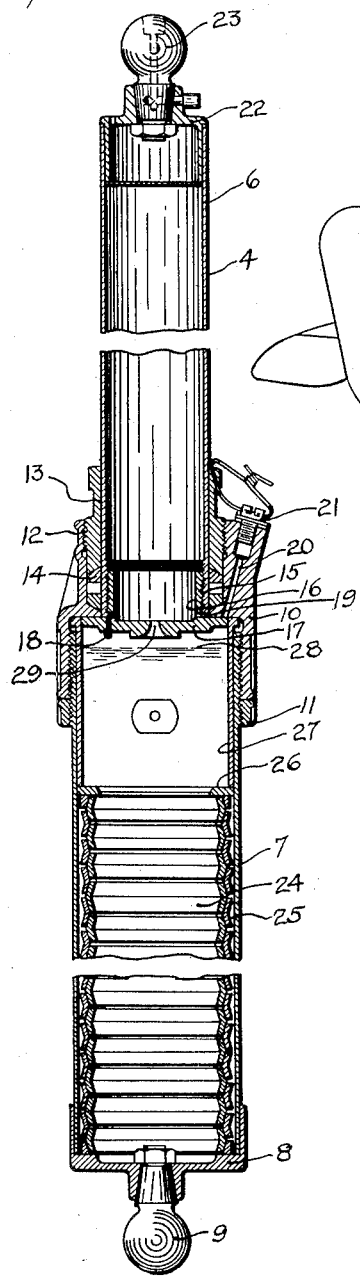
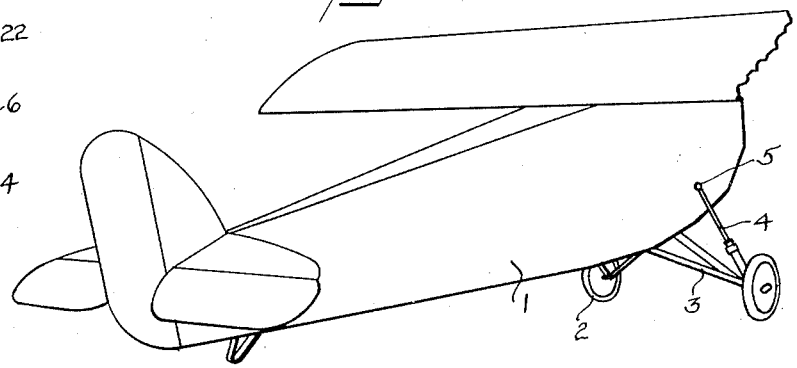
Inventor
Frederick R. Weymouth
By Edward T. Noé Jr.
Attorney Patented Aug. 6, 1929.

1,723,963

UNITED STATES PATENT OFFICE.

FREDERICK R. WEYMOUTH, OF HEMPSTEAD, NEW YORK, ASSIGNOR TO FAIRCHILD AIRPLANE MANUFACTURING CORPORATION, OF NEW YORK, N. Y.

AIRPLANE SHOCK ABSORBER.

Application filed April 4, 1927. Serial No. 180,851.

This invention relates to shock absorbers and particularly to shock absorbers for the landing chasses of airplanes.

The primary object of the invention is the provision of a shock absorber especially adapted for aircraft use, which incorporates both a liquid damping means for absorbing the initial major shock of landing, and a resilient device for resiliently supporting the load. The resilient device preferably comprises a series of rings having frictionally inter-engaging surfaces which are adapted to slide one on the other, as the friction rings telescope together when a load is applied. Such rings may be in the form of endless bands, presenting slightly tapered friction surfaces of a character which place the bands under radial tensional and compressional strains, when the series of rings is compressed in the direction of its axis.

As preferably constructed the shock absorber is in the form of an elongated casing composed of a lower part and an upper part telescopically received therein and of smaller diameter than the lower part, the lower part forming a housing for the series of friction rings and also a container or receptacle for a quantity of damping liquid which substantially fills the lower part of the casing. This damping liquid finds its way through a small orifice, past the piston on the lower end of the upper part of the casing when the initial shock of landing is absorbed, and the subsequent action of the ring springs permits the resilient support of the load.

A further object of the invention is the provision of this type of airplane shock absorber as an elongated member with means at either end for attachment to the fuselage and to the landing gear axle, so that the entire shock absorber casing may serve as a strut to interconnect the axle to the fuselage.

Further objects and advantages of my invention will more fully appear in the following description of the preferred embodiment as illustrated in the drawings, in which Fig. 1 is a central section through the shock absorber, and Fig. 2 is a perspective view of the application of the shock absorber to an airplane.

Referring more particularly to the drawings by reference numerals, the airplane shown in Fig. 2 designated generally 1, is provided with two landing wheels 2, each of which is supported with an axle member 3 each of which is hinged at its inner end to the lower central portion of the fuselage. The axles 3 which support the wheels are formed of a V shape so that the wheels are braced in a fore and aft direction in a rigid manner. The wheels 2 are permitted to yield vertically by means of the shock absorber casing 4 which acts as a strut between the connection 5 at the fuselage and the connection at the lower end of the casing where it is attached to the apex of the V of the axle 3.

The shock absorber 4 is formed of an upper casing member 6, formed as an elongated cylinder closed at its upper end and telescopically engaging the upper end of the lower casing member 7. The lower casing member 7 is permanently connected at its lower end to an end plate 8 in which is fastened the spherical end connection 9. It will be understood that the spherical end connection or ball 9 forms part of the ball and socket joint which is provided to interconnect the casing to the landing wheel axle. The upper end of casing member 7 is threaded into a casting 10, and a lock nut 11 holds these two parts assembled. The casting 10 is provided with a thread 12 which receives the gland nut 13 by means of which the packing 14 is held in place. This packing forms a fluid tight connection so that the lower end of the upper casing 6 may move up and down within the gland nut 13, which is comparatively long so that the joint between the two members 6 and 7 may withstand bending strains.

The lower end of the upper casing member 6 is provided with internal threads 15 which receive threads provided in the cylindrical extension 16 of the plunger or piston 17. The plunger or piston 17 is thus fastened securely to the casing member 6 and is prevented from becoming loose due to rotation by the cotter pin 18. A small passage 19 is provided in the side of the cylindrical member 16 as shown and a passage 20 closed by a screw member 21 is provided in the casting 10 through which oil may be supplied to the casing.

The upper end of the casing member 6 is permanently fastened to an end cap 22 which rigidly holds the ball 23 which is adapted to co-operate with the socket at the point 5 where the casing is attached to the fuselage.

The lower casing member 7 supports a series of endless or integrally closed rings there being a number of inner rings 24 and outer rings 25 which are provided with tapered frictionally and telescopically engaging surfaces. The taper provided on these friction surfaces is of a character which places the rings under inter-dependent frictional and radial tensional and compressional strains when the series is compressed in the direction of the main axis of the casing. The internally tapered rings 25 are made of a high tensile strength material such as steel and the externally double tapered rings 24 are constructed of a material such as duralumin which has a high compressive strength weight ratio. The rings are compressed together by a follower 26 which is shown in its normal position against the bushing 27 which is fixed within the upper end of the casing member 7. The follower 26 is moved downwardly to compress the rings together, by the piston member 17 which engages the follower after the piston has traveled through a small distance from the position shown in Fig. 1. The lower casing member 7 is full of a suitable damping fluid, preferably a liquid 28 such as oil, and this lower casing member 7 is of substantially larger diameter than the upper casing member 6 which, however, is of greater length than the lower casing member. The piston 17 may therefore travel downwardly within the casing member 7 so as to engage the follower 26 and compress the rings to their utmost before the upper casing member 7 is completely filled with the damping oil. This oil finds its way through a suitable leak around or through the piston 17 and for this purpose a small orifice 29 is provided in the center of the piston. This orifice is of such size that the initial major shock of landing is absorbed without rebound mainly in the "squash" of the damping liquid as the oil flows through the restricted orifice into the upper casing member 6. The initial shocks of landing which are even greater than usual, are absorbed first by the "squash" of the damping liquid and then by the friction ing springs which are compressed as previously mentioned. The springs yieldingly support the load without appreciable rebound, as the rebound is largely absorbed by the friction between the rings and by the restriction of the opening 29 provided for the flow of damping liquid which retards down-flow as well as up-flow of liquid. After the initial shock of landing has been absorbed the airplane is resiliently supported by means of the friction rings or springs which absorb the minor shocks as the airplane runs along the ground.

It will thus be apparent that a shock absorber has been provided for an airplane, which will offer a minimum of resistance to the wind and which will serve not only as a shock absorber but also as a strut for interconnecting the fuselage and the landing wheel. The casing which thus acts as a strut contains within a comparatively small diameter both the liquid damping means for absorbing the initial shock of landing and the friction rings for resiliently supporting the load.

I do not intend to be limited to the precise form of construction which has been shown herein for purposes of illustration of my invention.

I claim:

1. In combination in an airplane shock absorber for landing chasses, a liquid damping means for absorbing the initial shock of landing without rebound and a device for resiliently supporting the load effective only after the initial shock of landing has been absorbed.

2. In a combination in an airplane shock absorber, a liquid damping means for absorbing the initial shock of landing and a resilient frictional device for resiliently supporting the load and effective to resiliently support the load only after initial shock of landing has been absorbed by said liquid damping means.

3. In combination in an airplane shock absorber, a casing, a liquid damping means therein for absorbing the major initial shock of landing without rebound, and a resilient device therein for resiliently supporting the load, and effective to resiliently support the load only after the major initial shock of landing has been absorbed by said liquid damping means.

4. In combination in an airplane shock absorber, a casing, a liquid damping means therein for absorbing the major initial shock of landing, and a resilient device therein for resiliently supporting the load, said device comprising a series of closed rings having complementary similarly tapered friction surfaces, such as to permit compression and rebound of the spring.

5. A shock absorber for airplanes comprising an elongated casing member formed of upper and lower telescoping sections, a quantity of damping fluid in the lower section, a piston member at the lower end of the upper section, a bypass orifice for said damping fluid, and a series of inter-engaging complementary friction members within the lower section adapted to be resiliently compressed by said piston member upon application of the load.

6. A shock absorber for airplanes comprising an elongated upper casing member, a lower casing member normally located below the level of said upper member, a quantity of damping liquid in said lower member, a series of ring springs having inter-engaging tapered frictional surfaces within said lower member, a member fixed to the lower end of said upper casing member adapted to act on said springs to compress the same upon application of the load, and a bypass to permit a limited flow of liquid from the lower to the upper casing member.

7. A shock absorber for airplanes comprising an elongated upper casing member, a lower casing member normally located below the level of said upper member, a quantity of damping liquid within said lower member, a series of ring springs having inter-engaging tapered frictional surfaces within said lower member, a follower fixed to the lower end of said upper casing member adapted to act on said springs to compress the same upon application of the load, and a bypass to permit a limited flow of liquid from the lower to the upper casing member, the upper casing member being of substantially greater length and smaller diameter than the lower casing member.

8. A shock absorber comprising an elongated casing formed of an upper and a lower section, a quantity of damping liquid substantially filling the lower section, a series of ring springs having tapered inter-engaging friction surfaces within said lower section, and a piston member normally located a substantial distance from the end of the series of ring springs.

9. A shock absorber for airplanes as set forth in claim 7, said upper casing member having a joint member at its upper end adapted to be connected to the fuselage, and said lower casing member having a joint member at its lower end adapted to be connected to the wheel axle.

10. A shock absorber of the class described comprising liquid damping means for absorbing initial shocks without substantial rebound, and additional means for resiliently receiving additional shocks and ineffective during the absorption of said initial shocks.

11. In a shock absorber of the class described, in combination, a cylinder, a piston movably received in said cylinder, liquid damping means for absorbing an initial shock without substantial rebound, and spring means for resiliently restraining movements of the piston and effective only after large degrees of movement of the piston within the cylinder.

12. In a device of the class described adapted to absorb the energy of exerted compressive forces, means for initially absorbing the energy of an exerted compressive force at a substantially constant rate, and additional means brought into operation when the first means has reached a predetermined positioning under the influence of said compressive forces for additionally absorbing energy of compressive forces.

13. In a device of the class described adapted to absorb the energy of exerted compressive forces, means for initially absorbing the energy of an exerted compressive force without substantial rebound, and additional means brought into operation when the first means has reached a predetermined positioning under the influence of said compressive forces for additionally absorbing energy of succeeding compressive forces in a resilient manner.

14. A shock absorber of the class described comprising liquid damping means for absorbing shocks, and a resilient frictional device normally immersed in the liquid for resiliently supporting a load.

15. A shock absorber for supporting a vehicle comprising a casing, liquid damping means in said casing for absorbing shocks, and a resilient spring device in said casing for resiliently supporting the load, said liquid damping means acting to restrict rebound of the spring device.

16. In an airplane shock absorber, a normally upright casing, liquid damping means in said casing for absorbing shocks, and a resilient frictional spring device normally immersed in the liquid tending to resiliently support the load, said liquid damping means acting to restrict rebound of the spring device.

In testimony whereof I have hereunto set my hand this 9th day of March, 1927.

FREDERICK R. WEYMOUTH.